(12) United States Patent
Beser

(10) Patent No.: US 7,529,272 B1
(45) Date of Patent: May 5, 2009

(54) RECEIVER DESIGN FOR IMPLEMENTING VIRTUAL UPSTREAM CHANNELS IN BROADBAND COMMUNICATION SYSTEMS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 295 days.

(21) Appl. No.: 11/564,646

(22) Filed: Nov. 29, 2006

Related U.S. Application Data

(63) Continuation of application No. 09/999,793, filed on Oct. 25, 2001, now Pat. No. 7,164,697.

(60) Provisional application No. 60/314,233, filed on Aug. 21, 2001.

(51) Int. Cl.
*H04J 1/00* (2006.01)
(52) U.S. Cl. ........................ 370/485; 725/111
(58) Field of Classification Search ......... 370/484–487; 725/111
See application file for complete search history.

(56) References Cited

U.S. PATENT DOCUMENTS

| | | | |
|---|---|---|---|
| 6,650,624 B1 | 11/2003 | Quigley et al. | |
| 6,728,887 B1 | 4/2004 | Dziekan et al. | |
| 7,068,597 B1 * | 6/2006 | Fijolek et al. | 370/230 |
| 7,085,285 B2 * | 8/2006 | Liu | 370/463 |
| 2002/0064169 A1 | 5/2002 | Gummalla et al. | |
| 2002/0116721 A1 * | 8/2002 | Dobes et al. | 725/129 |
| 2002/0129378 A1 * | 9/2002 | Cloonan et al. | 725/111 |
| 2003/0002499 A1 | 1/2003 | Cummings et al. | |
| 2003/0012223 A1 | 1/2003 | Chappell et al. | |

OTHER PUBLICATIONS

Co-pending U.S. Appl. No. 09/999,790, filed Oct. 25, 2001 for Virtual Upstream Channel Provisioning and Utilization in Broadband Communication Systems.
Co-pending U.S. Appl. No. 10/032,622, filed Oct. 25, 2001 for Virtual Upstream Channel Scheduling in Broadband Communication Systems.

* cited by examiner

*Primary Examiner*—Brian D Nguyen
(74) *Attorney, Agent, or Firm*—Harrity & Harrity, LLP

(57) ABSTRACT

A method and apparatus for scheduling virtual upstream channels within one physical upstream channel is disclosed. A different MAP message is received by a receiver for each virtual upstream channel from that sent downstream. Where multiple upstream receivers are used, separate MAP messages can be sent for each receiver and consequently, each virtual upstream channel. The use of multiple upstream receivers is not necessary if the upstream receiver can change the upstream channel descriptors it is using per burst.

20 Claims, 17 Drawing Sheets

| Type 1 | Length 1 | Symbol Rate |
|---|---|---|
| Type 2 | Length 4 | Frequency |
| Type 3 | Length 1-128 | Preamble Superstring |
| Type 4 | Length N | First Burst Descriptor |
| Type 4 | Length N | Second Burst Descriptor |
| Type 4 | Length N | Third Burst Descriptor |
| Type 4 | Length N | Fourth Burst Descriptor |

Prior Art
FIGURE 5

RECEIVER DESIGN FOR IMPLEMENTING VIRTUAL UPSTREAM CHANNELS IN BROADBAND COMMUNICATION SYSTEMS

RELATED APPLICATIONS

This application is a continuation of U.S. patent application Ser. No. 09/999,793 filed Oct. 25, 2001, now U.S. Pat. No. 7,164,697 hereby incorporated by reference, which claims priority from an earlier-filed provisional patent application No. 60/314,233 entitled "Virtual Upstream Channels" filed on Aug. 21, 2001, which is also hereby incorporated herein by reference.

FIELD OF THE INVENTION

The present invention relates to broadband communications systems. More particularly, the present invention is directed to the design of receivers in broadband systems such as cable modem systems.

BACKGROUND

Recently, there has been an explosive demand for services, such as data, voice, and video, to be delivered over broadband communications systems. So-called cable modem technology is one of the most popular methods of providing such broadband services to subscribers. Cable modem technology competes with technologies such as Asymmetric Digital Subscriber Lines (ADSL) and ISDN (Integrated Services Digital Network). Many in the industry forecast that cable modem systems will be the prevailing technology for providing broadband services since cable television is already widely in use.

FIG. 1 illustrates a simplified diagram of a conventional cable modem system. The DOCSIS (Data Over Cable Service Interface Specifications) Radio Frequency Interface Specification specifies the transfer of IP traffic, between the cable headend system and customer locations, over an all-coaxial or a hybrid-fiber/coax (HFC) cable network 52. The transmission path over the cable system is realized at the headend by a Cable Modem Termination System (CMTS) 50, and at each customer location by a Cable Modem (CM) 56. The DOCSIS standard defines a single transmitter for each downstream channel—the CMTS 50. All CMs 56 listen to all frames transmitted on the downstream channel upon which they are registered and accept those where the destinations match the CM 56 itself or CPEs (Customer Premises Equipment) 58 connected. CMs 56 can communicate with other CMs 56 only through the CMTS 50.

The upstream channel is characterized by many transmitters (i.e. CMs 56) and one receiver (i.e. the CMTS 50). Time in the upstream channel is slotted, providing for TDMA at regulated time ticks. The CMTS 50 provides the time reference and controls the allowed usage for each interval. Intervals may be granted for transmissions by particular CMs 56, or for contention by all CMs 56. CMs 56 may contend to request transmission time. To a limited extent, CMs 56 may also contend to transmit actual data. In both cases, collisions can occur and retries are used.

The upstream Physical Media Dependent (PMD) sublayer uses a Frequency Division Multiple Access (FDMA)/TDMA burst modulation format, which provides five symbol rates and two modulation formats (Quadrature Phase Shift Keying (QPSK) and 16-QAM (Quadrature Amplitude Modulation)). The modulation format includes pulse shaping for spectral efficiency, is carrier-frequency agile, and has selectable output power level. The PMD sublayer format includes a variable-length modulated burst with precise timing beginning at boundaries spaced at integer multiples of 6.25 sec apart (which is 16 symbols at the highest data rate). Each burst supports a flexible modulation, symbol rate, preamble, randomization of the payload, and programmable FEC (Forward Error Correction) encoding. All of the upstream transmission parameters associated with burst transmission outputs from the CM 56 are configurable by the CMTS 50 via MAC (Media Access Controller) messaging.

The upstream modulator is part of the CM 56 which interfaces with the cable network. The modulator contains the actual electrical-level modulation function and the digital signal-processing function; the latter provides the FEC, preamble prepend, symbol mapping, and other processing steps. The DOCSIS standard was developed with the idea of buffering the bursts in the signal processing portion, and with the signal processing portion (1) accepting the information stream a burst at a time, (2) processing this stream into a complete burst of symbols for the modulator, and (3) feeding the properly-timed bursted symbol stream to a memoryless modulator at the exact burst transmit time. The memoryless portion of the modulator only performs pulse shaping and quadrature upconversion.

At the Demodulator, similar to the Modulator, there are two basic functional components: the demodulation function and the signal processing function. Unlike the Modulator, the Demodulator resides in the CMTS 50 and the DOCSIS standard envision that there will be one demodulation function (not necessarily an actual physical demodulator) for each carrier frequency in use. The demodulation function would receive all bursts on a given frequency.

The demodulation function of the Demodulator accepts a varying-level signal centered around a commanded power level and performs symbol timing and carrier recovery and tracking, burst acquisition, and demodulation. Additionally, the demodulation function provides an estimate of burst timing relative to a reference edge, an estimate of received signal power, an estimate of signal-to-noise ratio, and may engage adaptive equalization to mitigate the effects of a) echoes in the cable plant, b) narrowband ingress and c) group delay. The signal-processing function of the Demodulator performs the inverse processing of the signal-processing function of the Modulator. This includes accepting the demodulated burst data stream and decoding, etc., and possibly multiplexing the data from multiple channels into a single output stream. The signal-processing function also provides the edge-timing reference and gating-enable signal to the demodulators to activate the burst acquisition for each assigned burst slot. The signal-processing function may also provide an indication of successful decoding, decoding error, or fail-to-decode for each codeword and the number of corrected Reed-Solomon symbols in each codeword. For every upstream burst, the CMTS 50 has a prior knowledge of the exact symbol rate, preamble, and burst length.

Consider the case of two cable modems (CMs) that belong to different cable segments communicating with a single Cable Modem Termination System (CMTS) illustrated in FIG. 2. In the conventional cable modem system operation, each cable modem CM 630 and CM 620 would share a single downstream path to obtain data/signals from the CMTS 610. Also, each cable modem CM 630 and CM 620 has its own upstream path to send data/signals to the CMTS 610. Thus, two upstream frequencies and one downstream frequency is used by the system of FIG. 2. The CMTS would have a port for each CM 630 and CM 620 for the upstream traffic thereto, while having only one port for downstream traffic to both CM 630 and CM 620. Since the port to which the CMs 630 and 620 are connected is known, the CMTS knows UCID (Upstream Channel Identifier, discussed below) to assign to each cable modem. Consequently, each UCID is associated with its own upstream frequency unique to the UCID in current DOCSIS implementations. Using the UCID it is possible for CMTS 610 to schedule the CMs 620 and 630 on different upstream frequencies and then send these scheduling information on the bandwidth allocation MAP messages. The bandwidth allocation MAP messages are first parsed for the UCID by the CM such that the CM would only listen to its own MAP messages that contain the scheduling information regarding the upstream channel that it will be transmitting. If a DOCSIS downstream is associated with for example, four upstreams, than the CMTS would send 4 bandwidth allocation MAP messages that each one specifies the bandwidth allocation to each frequency that it is associated.

The UCID is also associated with an Upstream Channel Descriptor (UCD). The Upstream Channel Descriptor defines multiple DOCSIS properties, such as mini-slot size, symbol rate, frequency, and preamble pattern and burst descriptor. In sum it can be said that, the UCID defines how the CM communicates to CMTS on the Physical Media Dependent (PMD) sublayer of DOCSIS specification.

FIG. 3 describes DOCSIS bandwidth allocation and where transmit opportunities occur. The CMTS controls assignments on the upstream channel through the bandwidth allocation MAP and determines which mini-slots are subject to collisions. The CMTS allows collisions on either Requests or Data PDUs (Protocol Data Units). A "transmit opportunity" ("tx opportunity") is defined as any mini-slot in which one or more CMs may be allowed to start a transmission. The CMTS generates the time reference for identifying these slots.

For example, it may grant some number of contiguous slots to a CM for it to transmit a data PDU. The CM times its transmission so that the CMTS receives it in the time reference specified. This section describes the elements of protocol used in requesting, granting, and using upstream bandwidth. The basic mechanism for assigning bandwidth management is the bandwidth allocation MAP.

Upstream bandwidth allocation is characterized as follows. The bandwidth allocation MAP is a MAC Management message transmitted by the CMTS on the downstream channel which describes, for some interval of time, the uses to which the upstream frequency will be used by a given CM. A given MAP may describe some time slots as grants for particular stations to transmit data in, other time slots as available for contention transmission, and other slots as an opportunity for new stations to join the link.

Many different scheduling algorithms may be implemented in the CMTS by different vendors as DOCSIS does not mandate a particular algorithm. Instead, it describes the protocol elements by which bandwidth is requested and granted. Each upstream channel is characterized by an Upstream Channel Descriptor (UCD). FIG. 4 illustrates basic structure of a UCD message. A UCD is transmitted by the CMTS at periodic intervals to define the characteristics of an upstream channel. A separate message is transmitted for each upstream that contains the following information:

Configuration Change Count: Incremented by one (modulo the field size) by the CMTS whenever any of the values of this channel descriptor change. If the value of this count in a subsequent UCD remains the same, the CM can quickly decide that the remaining fields have not changed, and may be able to disregard the remainder of the message. This value is also referenced from the MAP.

Mini-slot Size: The size T of the Mini-Slot for this upstream channel in units of the Timebase Ticks of 6.25 s. Allowable values are $T=2.\sup.M$, =1, ... 7. That is, T=2, 4, 8, 16, 32, 64 or 128.

UCID: The identifier of the upstream channel to which this message refers. This identifier is arbitrarily chosen by the CMTS and is only unique within the MAC-Sublayer domain.

Downstream Channel ID: The identifier of the downstream channel on which this message has been transmitted. This identifier is arbitrarily chosen by the CMTS and is only unique within the MAC-Sublayer domain.

Burst Descriptors: Burst Descriptors are composed of an upstream Interval Usage Code, followed by encoding that defines, for each type of upstream usage interval, the physical-layer characteristics that are to be used during that interval. A burst profile consists of a set of specific PHY (physical layer) parameters-modulation, preamble length, Reed-Solomon block size, Reed-Solomon error correction capability, scrambler seed, differential encoding on/off, shortened last codeword mode on/off, maximum burst size, and guard time size. Burst profiles are assigned on an upstream channel basis in a downstream MAC Management Message called the Upstream Channel Descriptor (UCD). The idea was that multiple burst profiles could be defined and that a cable modem (CM) would have these sets of parameters stored in the PHY transmitter, and the CM could make use of different burst profiles.

FIG. 5 illustrates The contents of overall channel information and burst descriptors which are Type Length Value (TLV) encoded. The first three TLVs that a UCD message contains symbol rate, frequency, and preamble superstring which applies to overall upstream channel. It also contains a plurality of burst descriptors which describes the characteristics of the upstream transmission depending on the Interval Usage Code (Table 1) of the transmission as scheduled by the CMTS with MAP messages.

FIG. 6 illustrates an upstream bandwidth allocation MAP message. The upstream bandwidth allocation MAP is a varying-length MAC Management message that is transmitted by the CMTS to define transmission opportunities on the upstream channel. It includes a fixed-length header followed by a variable number of information elements (IEs) message which contains the information regarding:

Upstream Channel ID: The identifier of the upstream channel to which this message refers.

UCD Count: Matches the value of the Configuration Change Count of the UCD which describes the burst parameters which apply to this map.

Number of Elements: Number of information elements in the map.

Alloc Start Time: Effective start time from CMTS initialization (in mini-slots) for assignments within this map.

Ack Time: Latest time, from CMTS initialization, (mini-slots) processed in upstream. This time is used by the CMs for collision detection purposes.

Ranging Backoff Start: Initial back-off window for initial ranging contention, expressed as a power of two. Values range 0 15 (the highest order bits must be unused and set to 0).

Ranging Backoff End: Final back-off window for initial ranging contention, expressed as a power of two. Values range 0 15 (the highest order bits must be unused and set to 0).

The allocation MAP is a varying-length MAC Management message that is transmitted by the CMTS to define transmission opportunities on the upstream channel. It includes a fixed-length header followed by a variable number of Information Elements (IEs) in the message being transmitted by the CMTS. The number of Transmit Opportunities associated with a particular Information Element (IE) in a MAP is dependent on the total size of the region as well as the allowable size of an individual transmission.

FIG. 7 illustrates the format of Information Elements. Each IE consists of a 14-bit Service ID, a 4-bit type code, and a 14-bit starting offset. Since all stations will scan all IEs, it is critical that IEs be short and relatively fixed format. IEs within the MAP are strictly ordered by starting offset. For most purposes, the duration described by the IE is inferred by the difference between the IEs starting offset and that of the following IE. For this reason, a Null IE terminates the list.

Table 1 below lists IEs and their corresponding Interval Usage Codes (IUCs).

Interval Usage Codes (IUCs).

TABLE 1

Information Elements and IUCs

| Interval Usage Code | Information Element Name |
| --- | --- |
| 1 | Request |
| 2 | REQ/Data |
| 3 | Initial Maintenance |
| 4 | Station Maintenance |
| 5 | Short Data Grant |
| 6 | Long Data Grant |
| 7 | Null IE |
| 8 | Data Acknowledge |
| 9-14 | Reserved |
| 15 | Expanded IUC |

As an example, assume a REQ (Request) IE defines a region of 12 mini-slots. If the UCD defines a REQ Burst Size that fits into a single mini-slot then there are 12 Transmit Opportunities associated with this REQ IE, i.e., one for each mini-slot. If the UCD defines a REQ that fits in two mini-slots, then there are six Transmit Opportunities and a REQ can start on every other mini-slot.

As another example, assume a REQ/Data IE that defines a 24 mini-slot region. If it is sent with an SID of 0x3FF4, then a CM can potentially start a transmit on every fourth mini-slot; so this IE contains a total of six Transmit Opportunities (TX OPs). Similarly, a SID of 0x3FF6 implies four TX OPs; 0x3FF8 implies three TX OPs; and 0x3FFC implies two TX OPs.

For an Initial Maintenance IE, a CM starts its transmission in the first mini-slot of the region; therefore it has a single Transmit Opportunity. The remainder of the region is used to compensate for the round trip delays since the CM has not yet been ranged. Station Maintenance IEs, Short/Long Data Grant IEs and unicast Request IEs are unicast and thus are not typically associated with contention Transmit Opportunities. They represent a single dedicated, or reservation based, Transmit Opportunity.

FIG. 8 illustrates the format of a DOCSIS MAC frame. A frame is a unit of data exchanged between two (or more) entities at the Data Link Layer. A MAC frame consists of a MAC Header and may incorporate a variable-length data PDU. The variable-length PDU includes a pair of 48-bit addresses, data, and a CRC (Cyclic Redundancy Check). In special cases, the MAC Header may encapsulate multiple MAC frames into a single MAC frame. A MAC frame is the basic unit of transfer between MAC sublayers at the CMTS and the cable modem. The same basic structure is used in both the upstream and downstream directions. MAC frames are variable in length. The term "frame" is used in this context to indicate a unit of information that is passed between MAC sublayer peers. Preceding the MAC frame is either PMD sublayer overhead (upstream) or an MPEG (Motion Picture Experts Group) transmission convergence header (downstream). The first part of the MAC frame is the MAC Header. The MAC Header uniquely identifies the contents of the MAC frame.

FIG. 9 illustrates the interchange between the CM and the CMTS when the CM has data to transmit Suppose a given CM has a data PDU available for transmission.

1. At time $t_1$, the CMTS transmits a MAP whose effective starting time is $t_3$. Within this MAP is a Request IE which will start at $t_5$. The difference between $t_1$ and $t_3$ is needed to allow for:

Downstream propagation delay (including FEC interleaving) to allow all CMs to receive the Map Processing time at the CM (allows the CMs to parse the Map and translate it into transmission opportunities)

Upstream propagation delay (to allow the CMs transmission of the first upstream data to begin in time to arrive at the CMTS at time $t_3$);

2. At $t_2$, the CM receives this MAP and scans it for request opportunities. In order to minimize request collisions, it calculates $t_6$ as a random offset based on the Data Backoff Start value in the most recent MAP;

3. At $t_4$, the CM transmits a request for as many mini-slots as needed to accommodate the PDU. Time $t_4$ is chosen based on the ranging offset so that the request will arrive at the CMTS at $t_6$.

4. At $t_6$, the CMTS receives the request and schedules it for service in the next MAP. (The choice of which requests to grant will vary with the class of service requested, any competing requests, and the algorithm used by the CMTS.)

5. At $t_7$, the CMTS transmits a MAP whose effective starting time is $t_9$. Within this MAP, a data grant for the CM will start at $t_{11}$.

6. At $t_8$, the CM receives the MAP and scans for its data grant.

7. At $t_{10}$, the CM transmits its data PDU so that it will arrive at the CMTS at $t_{11}$. Time $t_{10}$ is calculated from the ranging offset as in step 3.

Steps 1 and 2 need not contribute to access latency if CMs routinely maintain a list of request opportunities. At Step 3, the request may collide with requests from other CMs and be lost. The CMTS does not directly detect the collision. The CM determines that a collision (or other reception failure) occurred when the next MAP fails to include acknowledgment of the request. The CM will then perform a back-off algorithm and retry.

At Step 4, the CMTS scheduler fail to accommodate the request within the next MAP. If so, it will reply with a zero-length grant in that MAP or discard the request by giving no grant at all. It will continue to report this zero-length grant in all succeeding maps until the request can be granted or is discarded. This will signal to the CM that the request is still pending. So long as the CM is receiving a zero-length grant, it will not issue new requests for that service queue.

DOCSIS allows various combinations of upstream and downstream channels within one MAC service access point. The upstream bandwidth allocation protocol allows for multiple upstream channels to be managed via one or many downstream channels. If multiple upstream channels are associated with a single downstream channel, then the CMTS sends one bandwidth allocation MAP per upstream channel. The bandwidth allocation MAP's channel identifier, taken with the Upstream Channel Descriptor Message, specifies to which channel each bandwidth allocation MAP applies. There is no requirement that the maps be synchronized across channels.

When a DOCSIS certified CM reboots it first scans for a downstream channel (it first looks into the stored last operational parameters). A downstream channel is considered valid when:
   synchronization of the QAM symbol timing
   synchronization of the FEC framing
   synchronization of the MPEG packetization
   recognition of SYNC downstream MAC messages is achieved.

After synchronization, the CM will wait for an upstream channel descriptor message (UCD) from the CMTS in order to retrieve a set of transmission parameters for a possible upstream channel. These messages are transmitted periodically from the CMTS for all available upstream channels and are addressed to the MAC broadcast address. The CM will determine whether it can use the upstream channel from the channel description parameters.

The CM would then pick one of the upstream channel IDs in its table and wait for the initial ranging period for this upstream channel ID in the bandwidth allocation MAP signal, and try to range in the timeframe allocated. If initial ranging is not successful, then the next upstream channel ID is selected, and the procedure restarted from UCD extraction. When there are no more channel IDs to try, then the CM will continue scanning to find another downstream channel.

The ranging request message does not include an Upstream Channel ID since it is inherently assumed in DOCSIS that the frequency defines the Upstream Channel ID. Due to this reason the DOCSIS specification mandates that the CM have to use whatever Upstream Channel ID is returned by the CMTS in the Ranging Response message. In other words even though the CM may choose any Upstream Channel ID to transmit the initial ranging request the CMTS has the ultimate power to make the CM to use a certain Upstream Channel ID.

From this point on the CM is to use the given Upstream Channel ID, when it is parsing for the transmission opportunities the CM has to first find the one with matching Upstream Channel ID. And then parse the bandwidth allocation MAP to find the SIDs that it is using. After the registration it is possible that the CM would receive a Upstream Channel Change Request message stating that it has to switch to a different Upstream Channel ID. The CM in response will be sending two Upstream Channel Change Response messages in the same frequency one that states the reception of the Upstream Channel Change request. Afterwards the CM is to parse for Upstream Channel ID bandwidth allocation MAP message for transmission opportunities send to broadcast SIDs or SIDs that belong to the CM.

If multiple downstream channels are associated with a single upstream channel, the CMTS must ensure that the bandwidth allocation MAP reaches all CMs. That is, if some CMs are attached to a particular downstream channel, then the bandwidth allocation MAP will be transmitted on that channel. This may necessitate that multiple copies of the same bandwidth allocation MAP be transmitted. The Alloc Start Time in the bandwidth allocation MAP header will always relate to the SYNC reference on the downstream channel on which it is transmitted.

If multiple downstream channels are associated with multiple upstream channels, the CMTS may need to transmit multiple copies of multiple maps to ensure both that all upstream channels are mapped and that all CMs have received their needed maps.

After synchronization, the CM will wait for an upstream channel descriptor message (UCD) from the CMTS in order to retrieve a set of transmission parameters for a possible upstream channel. The UCD messages are transmitted periodically from the CMTS for all available upstream channels and are addressed to the MAC broadcast address. The CM will determine whether it can use the upstream channel from the channel description parameters.

The CM will collect all UCDs, which are different in their upstream channel ID field to build a set of usable channel IDs. If no channel can be found after a suitable timeout period, then the CM will continue scanning to find another downstream channel. The CM determines whether it can use the upstream channel from the channel description parameters. If the channel is not suitable, then the CM will try the next upstream channel ID until it finds a usable channel. If the channel is suitable, the CM will extract the parameters for this upstream from the UCD. It then will wait for the next SYNC message and extract the upstream mini-slot timestamp from this message. The CM then will wait for a bandwidth allocation MAP for the selected channel. It may begin transmitting upstream in accordance with the MAC operation and the bandwidth allocation mechanism.

The CM will perform initial ranging at least once. If initial ranging is not successful, then the next upstream channel ID is selected, and the procedure restarted from UCD extraction. When there are no more channel IDs to try, then the CM will continue scanning to find another downstream channel. At any time after registration, the CMTS may direct the CM to change its upstream channel. This can be done for traffic balancing, noise avoidance, or any of a number of other reasons.

FIG. 10 illustrates an example of a single downstream channel and four upstream channels. In FIG. 10, the four upstream channels are on separate fibers serving four geographical communities of modems. The CMTS has access to the one downstream and all four upstreams, while each CM has access to the one downstream and only one upstream.

In this topology, the CMTS transmits Upstream Channel Descriptors (UCDs) and MAPs for each of the four upstream channels related to the shared downstream channel. Unfortunately, each CM cannot determine which fiber branch it is attached to because there is no way to convey the geographical information on the shared downstream channel. At initialization, the CM randomly picks a UCD and its corresponding MAP. The CM then chooses an Initial Maintenance opportunity on that channel and transmits a Ranging Request.

The CMTS will receive the Ranging Request and will redirect the CM to the appropriate upstream channel identifier by specifying the upstream channel ID in the Ranging Response. The CM will then use the upstream channel ID of the Ranging Response, not the channel ID on do which the Ranging Request was initiated. This is necessary only on the first Ranging Response received by the CM. The CM will continue the ranging process normally and proceed to wait for station maintenance IEs. From then on, the CM will be using the bandwidth allocation MAP that is appropriate to the fiber branch to which it is connected. If the CM ever has to redo initial maintenance, it may start with its previous known UCD instead of choosing one at random.

Below are the MAC messages that contain Channel Ids:
   Upstream Channel Descriptor
   Bandwidth Allocation MAP
   Ranging Response Dynamic Channel Change request
   With unsynchronized timestamps:
   Since upstream synchronization relies on downstream timestamps, each upstream channel must be associated with the time stamp of one of the downstream channels.
   The downstream channels should only transmit MAP messages and UCD messages that pertain to their associated upstream channels.

To highlight the key points of conventional architectures, current DOCSIS implementations use one frequency per DOCSIS Upstream Channel:

Only two upstream burst profiles are available for data that is granted;

There are rules defining which of the two burst profiles is used based solely upon MAC PDU length; and All CMs on the same upstream channel use the same minislot size, symbol rate, and burst profiles.

FIG. 11 illustrates a DOCSIS System with cable modems of different noise levels. For example, suppose on an upstream channel, some CMs can achieve adequate upstream Bit Error Rate (BER) performance using 16-QAM and a relatively low error-correcting Reed-Solomon code while others require QPSK and more Reed-Solomon error correction as depicted in FIG. 11. The modems depicted on the upper portion have better performance (such that a less robust more efficient burst profile can be used) on their portion of the cable segment such that they can sustain a 16-QAM modulation whereas the CMs on the lower portion has a worse performing cable segment (needs more robust hence less efficient burst profile) such that they can only sustain acceptable BER with QPSK modulation.

If these CMs are to run on the present DOCSIS systems, and it is desired to provide all CMs with adequate BER performance, the upstream channel descriptor parameters will have to accommodate the CMs experiencing the less robust transmission, in other words the DOCSIS upstream channel has to be used as if all the CMs are in the same noise/performance characteristics of the worst connection as shown in FIG. 12. In FIG. 12 all CMs are forced to QPSK modulation.

However, this is a sacrifice to the CMs, which can successfully use 16-QAM and less Reed-Solomon parity, and it is a sacrifice to the system as a whole because the capacity of the upstream channel could be much better utilized by some CMs as opposed to others.

Segregating modems into two distinct upstream frequencies has a number of objections. In some cases, from a node, there will only be one upstream frequency available, all the other frequencies will be used for other purposes such as Video on demand, non-DOCSIS voice transport. Also, the number of CMs in the high and low error rate categories may not correspond well with the available capacity of the different channels provided to them. For example it is possible that only a cope of modems are in the high noise region that requires QPSK modulation.

One solution is to segregate CMs experiencing higher error rates on particular frequencies that run at more robust transmission modes. Assume that as depicted in FIG. 13 there are two DOCSIS upstream frequencies (RF Frequency #1 and RF Frequency #2 with upstream channel descriptors set as such that the CMs with lower noise will run 16-QAM and higher will run in QPSK mode with proper settings. Another consideration is that high utilization on a particular channel associated with a particular level of BER performance may prevent another CM from being assigned to it, and thus, the CM is put on another channel where it really does not belong. It would be much more efficient from a system standpoint to have the ability to handle both on the same channel.

It would seem impairments impact all CMs on an upstream plant or upstream channel, and thus, allowing some CMs to use 16-QAM and less Reed-Solomon parity and others QPSK and that more Reed-Solomon parity is not necessary. For Additive White Gaussian Noise, impulse noise, or narrowband ingress, the noise "funneling" effect of the upstream HFC plant (by nature of the topology) results in impact on all users on that upstream channel. So, knowledge of the level of these impairments on an upstream channel helps to determine the baseline burst profile parameters to be set to make the upstream transmission robust. This can be done in an automated fashion by a CMTS with advanced channel monitoring capabilities.

However, there are other impairments that do not impact all CM signals received in the upstream, but may only impact a particular CM or CMs on a segment of the plant. For example, impairments and distortion can be due to a tap or amplifier that is malfunctioning or has degraded. Or for example, a particular CM may have a degraded component or suffer a non-fatal fault that impacts its transmission performance. In these cases, it would be possible for the CMTS, through its channel monitoring functions, to ascertain which CM or CMs are impacted, and it would be beneficial that these modems could be assigned upstream channels that could better overcome their localized impairments.

Recently, one innovation in channel architecture has been the introduction of 'virtual upstream channels' which are used to segregate a single physical upstream channel. This is more fully described in co-pending U.S. patent application Ser. No. 09/999,790, filed on Oct. 25, 2001, entitled "VIRTUAL UPSTREAM CHANNEL PROVISIONING AND UTILIZATION IN BROADBAND COMMUNICATION SYSTEMS," (hereinafter referred to as "Provisioning patent") the specification of which is incorporated by reference herewith. In the Virtual Upstream patent, initialization, assigning and provisioning of virtual upstream channels in a DOCSIS system was introduced. The methodology and apparatus to manage the scheduling of virtual channels is more fully discussed in another co-pending patent application, entitled "VIRTUAL UPSTREAM CHANNEL SCHEDULING IN BROADBAND COMMUNICATION SYSTEMS," filed on Oct. 25, 2001, having Ser. No. 10/032,622 (hereinafter "Scheduling patent").

SUMMARY OF THE INVENTION

A method and apparatus for implementing receivers using virtual upstream channels within one physical upstream channel is disclosed. In one embodiment, a different MAP message is received by a receiver for each virtual upstream channel from that sent downstream. In this embodiment, the MAP for each virtual upstream channel (which is sent downstream by the CMTS) is combined into a single, different MAP message that is intended for the receiver.

In another embodiment of the invention, a separate receiver, each tuned to the same frequency is implemented in the system for each virtual upstream channel. In this embodiment, separate MAP messages can be sent for each receiver and consequently, each virtual upstream channel.

In other embodiments, the use of multiple upstream receivers is not necessary if the upstream receiver can change the upstream channel descriptors it is using per burst. This can be implemented using two different mechanisms: 1) using SID information, and 2) changing upstream profile context.

BRIEF DESCRIPTION OF THE DRAWINGS

FIG. 5 illustrates an Upstream Channel Descriptor Message;

DETAILED DESCRIPTION OF THE INVENTION

In brief, the invention, in various embodiments, consists of a method and apparatus for the design and implementation of upstream channel receivers, which are present in the CMTS and head-end central offices, such that they are capable of handling virtual upstream channels. In one embodiment, upstream receivers using virtual upstream channels receive a different MAP description than that sent downstream with the UCIDs.

Figure 1:
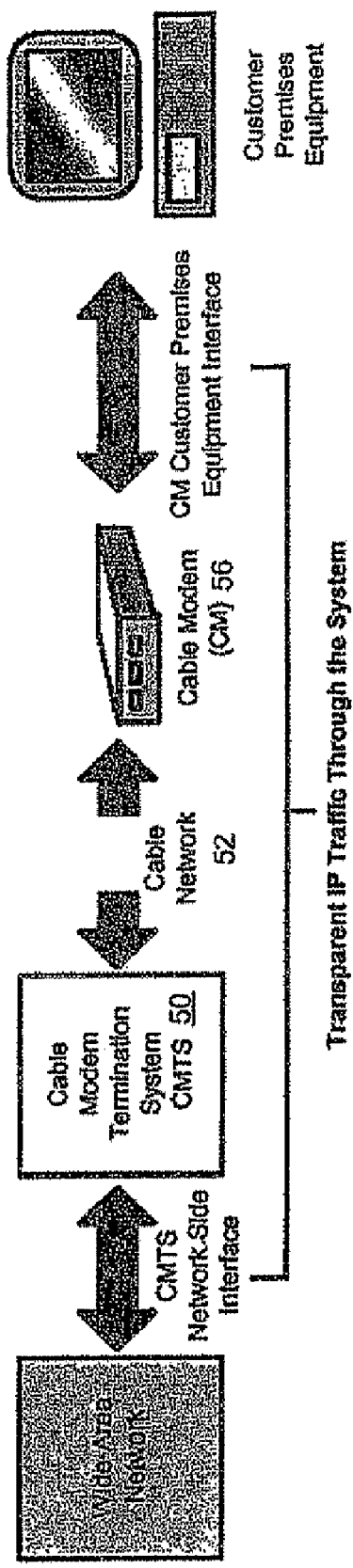
FIG. 1 illustrates a simplified diagram of a conventional cable modem system.
Figure 2:
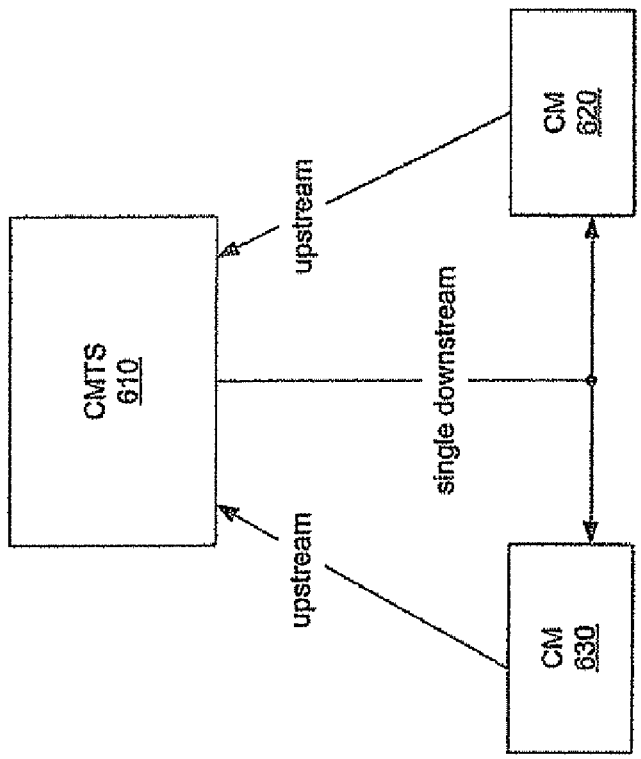
FIG. 2 illustrates the case of two cable modems (CMs) communicating with a single Cable Mode Termination System (CMTS)
Figure 3:
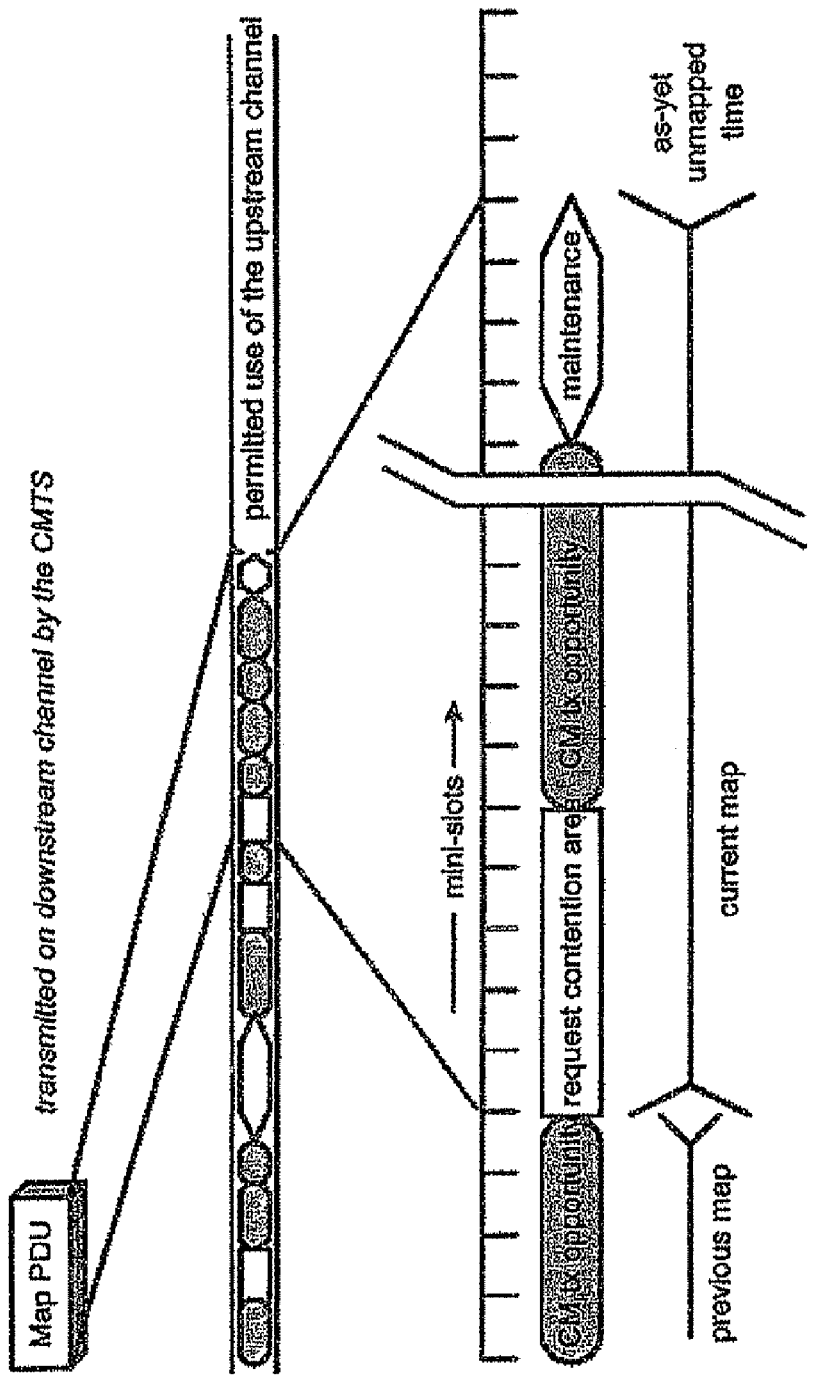
FIG. 3 describes DOCSIS bandwidth allocation and where transmit opportunities occur.
Figure 4:
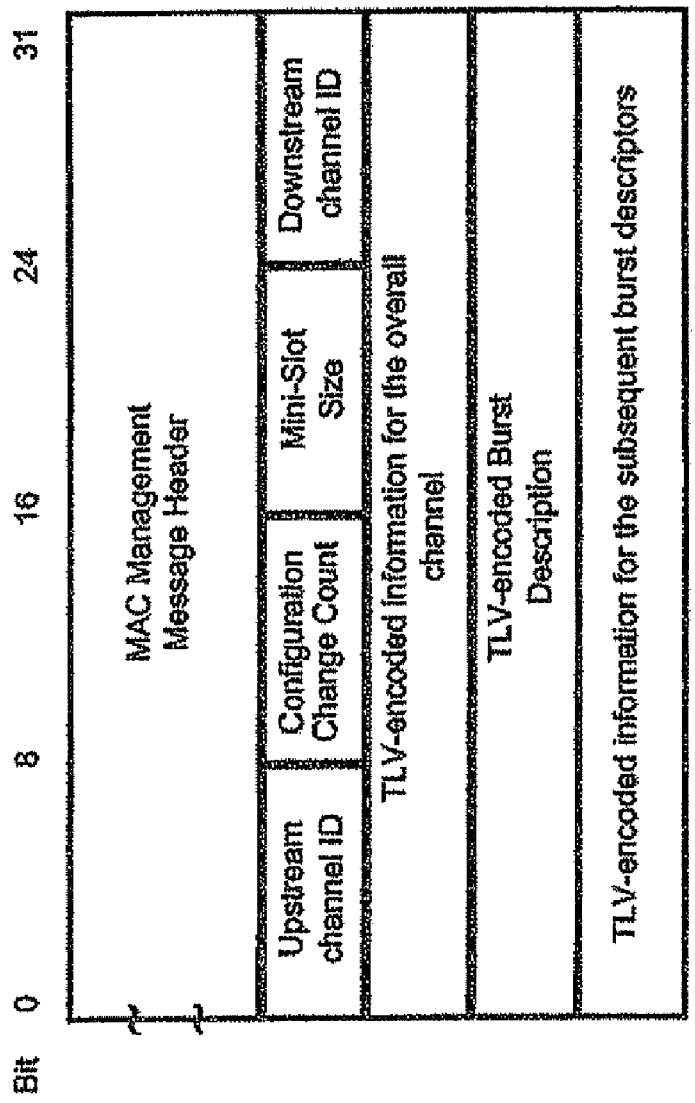
FIG. 4 illustrates an exemplary UCD.
Figure 6:
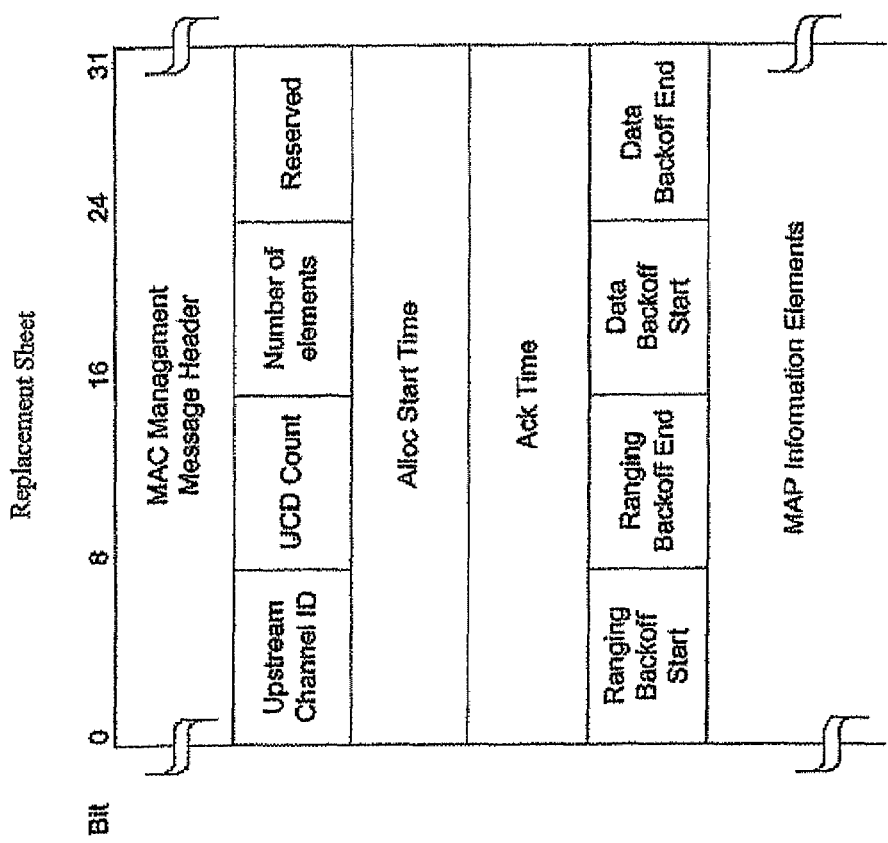
FIG. 6 illustrates an upstream bandwidth allocation MAP message.
Figure 7:
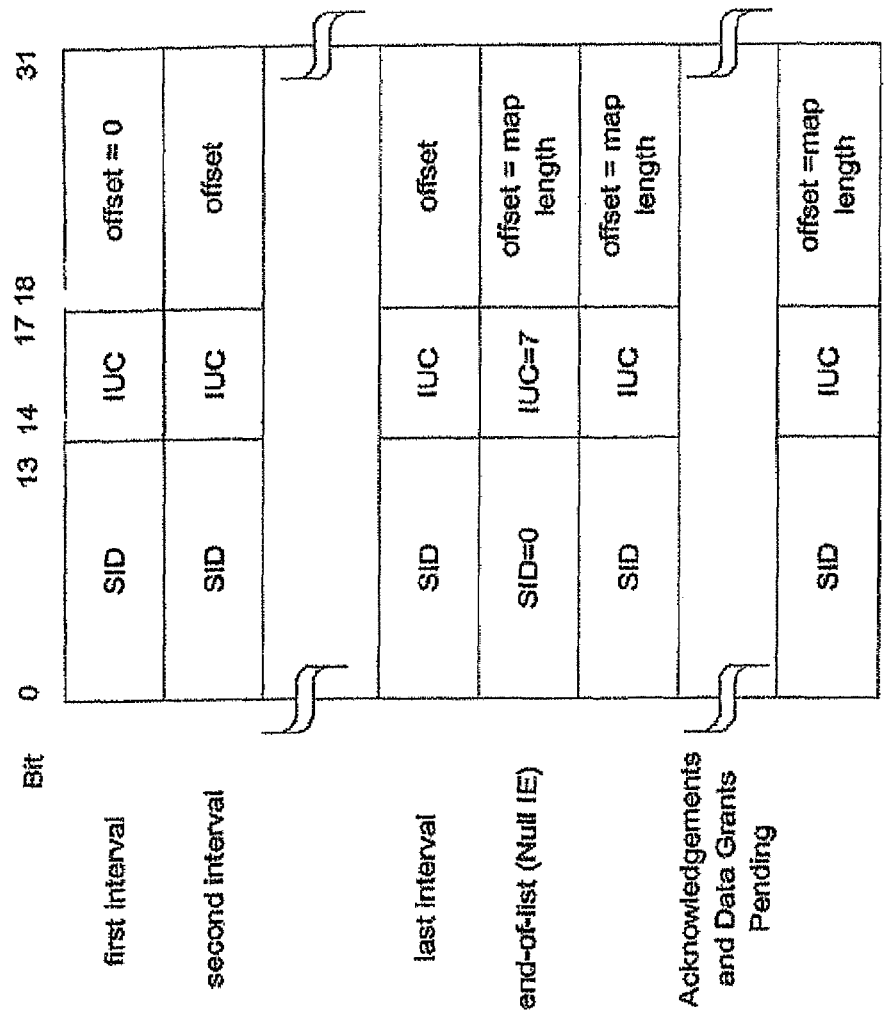
FIG. 7 illustrates the format of Information Elements.
Figure 8:
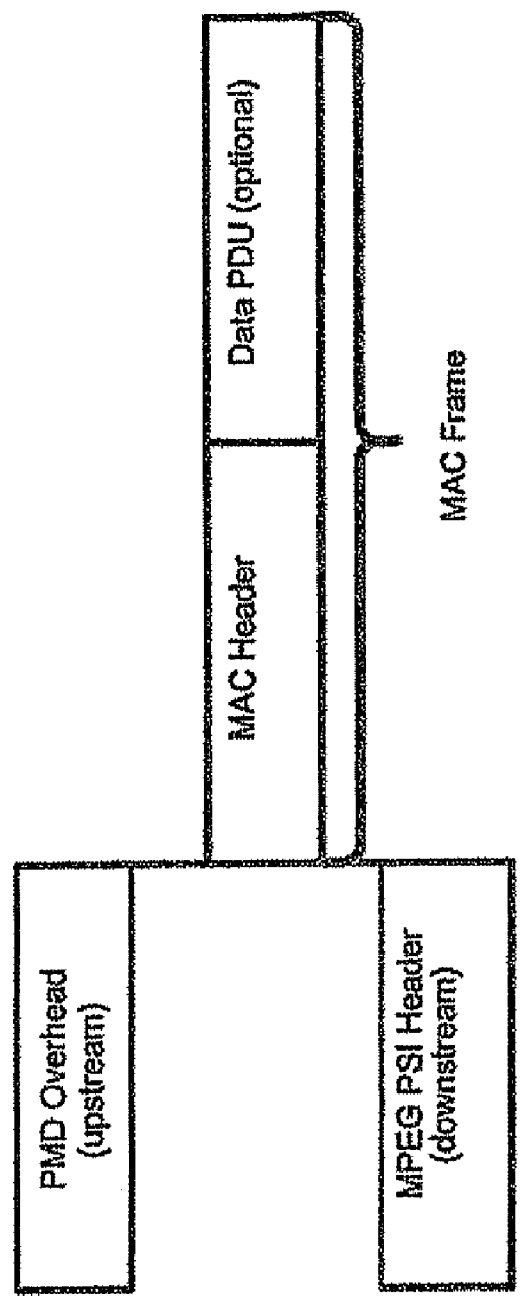
FIG. 8 illustrates the format of a DOCSIS MAC frame.
Figure 9:
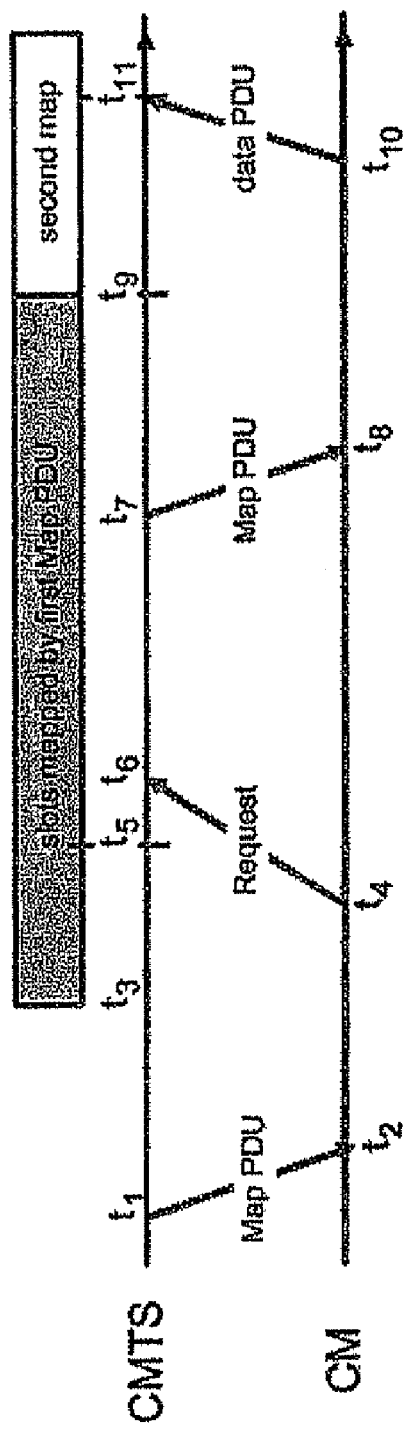
FIG. 9 illustrates the interchange between the CM and the CMTS when the CM has data to transmit Suppose a given CM has a data PDU available for transmission.
Figure 10:
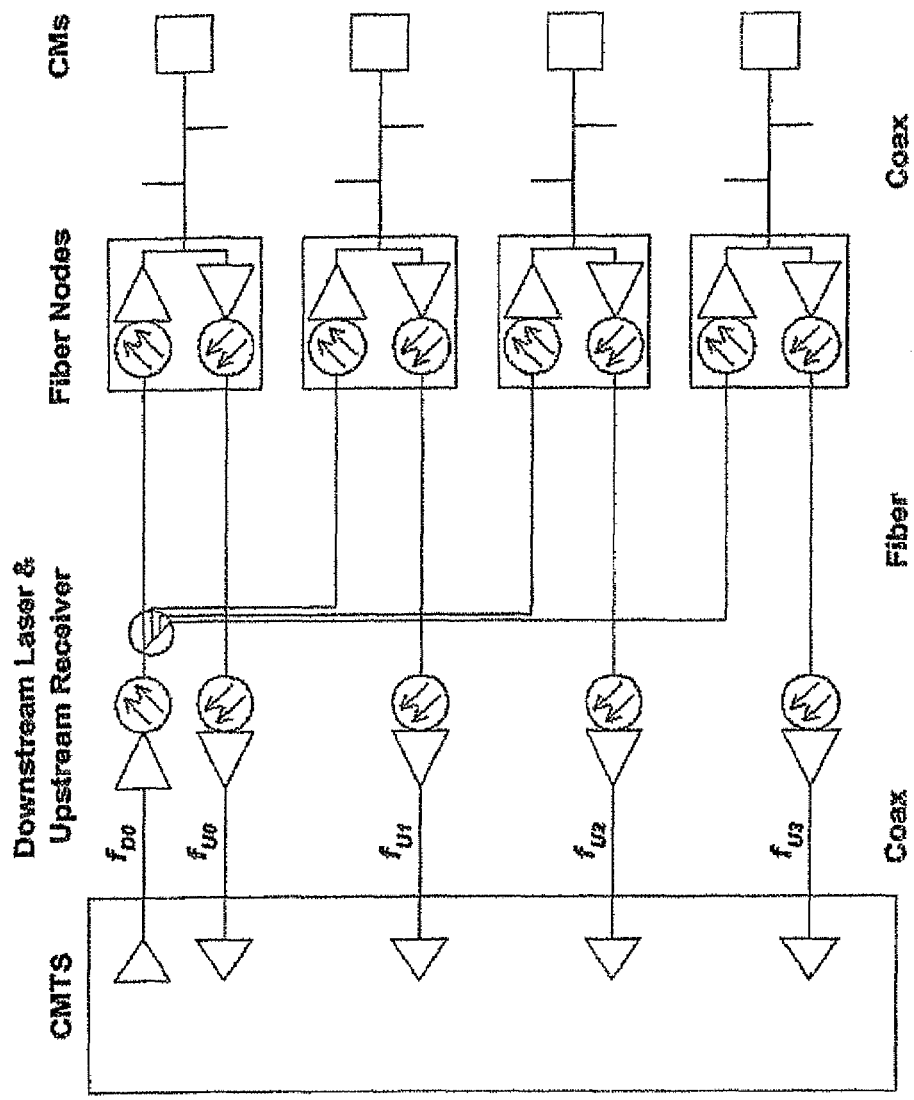
FIG. 10 illustrates an example of a single downstream channel and four upstream channels.
Figure 11:
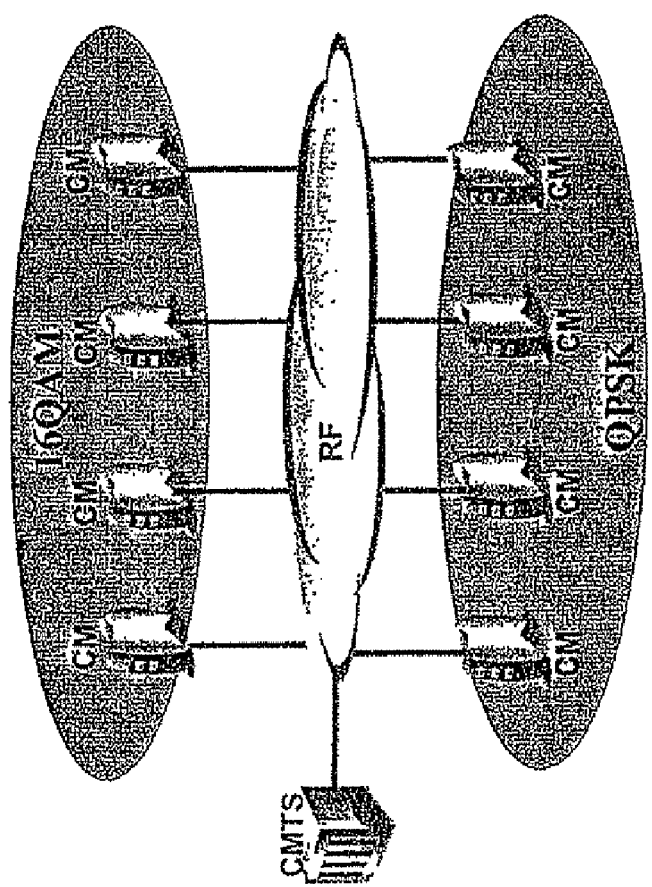
FIG. 11 illustrates a DOCSIS System with cable modems of different noise levels.
Figure 12:
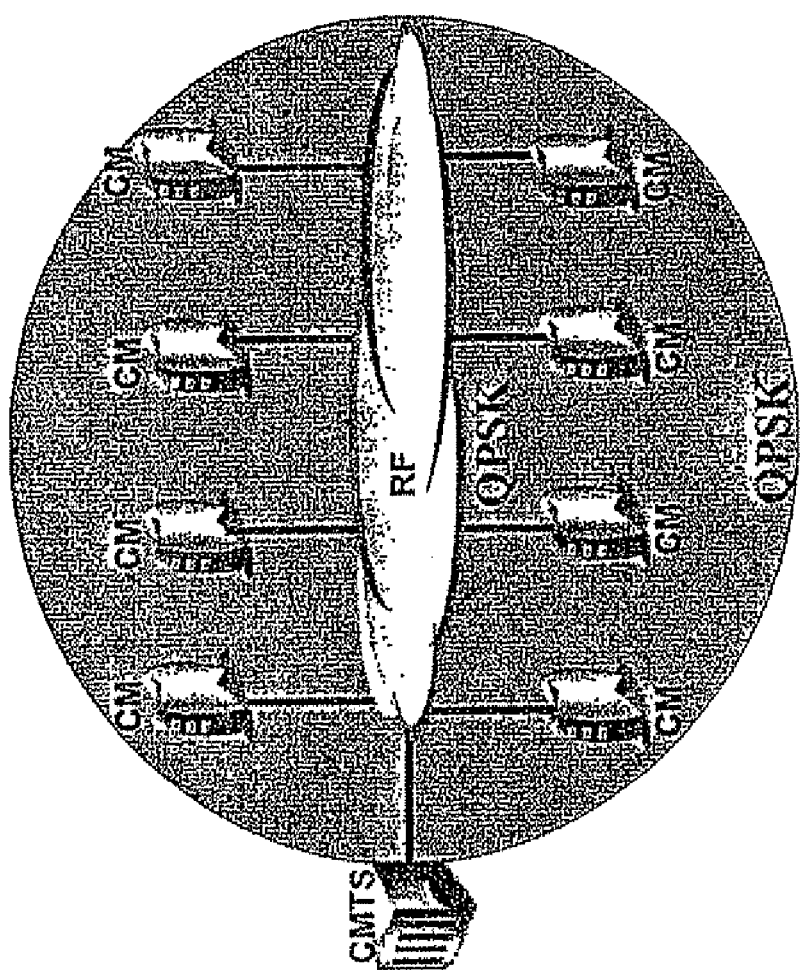
FIG. 12 illustrates a DOCSIS System with cable modems forced to operate using QPSK modulation.
Figure 13:
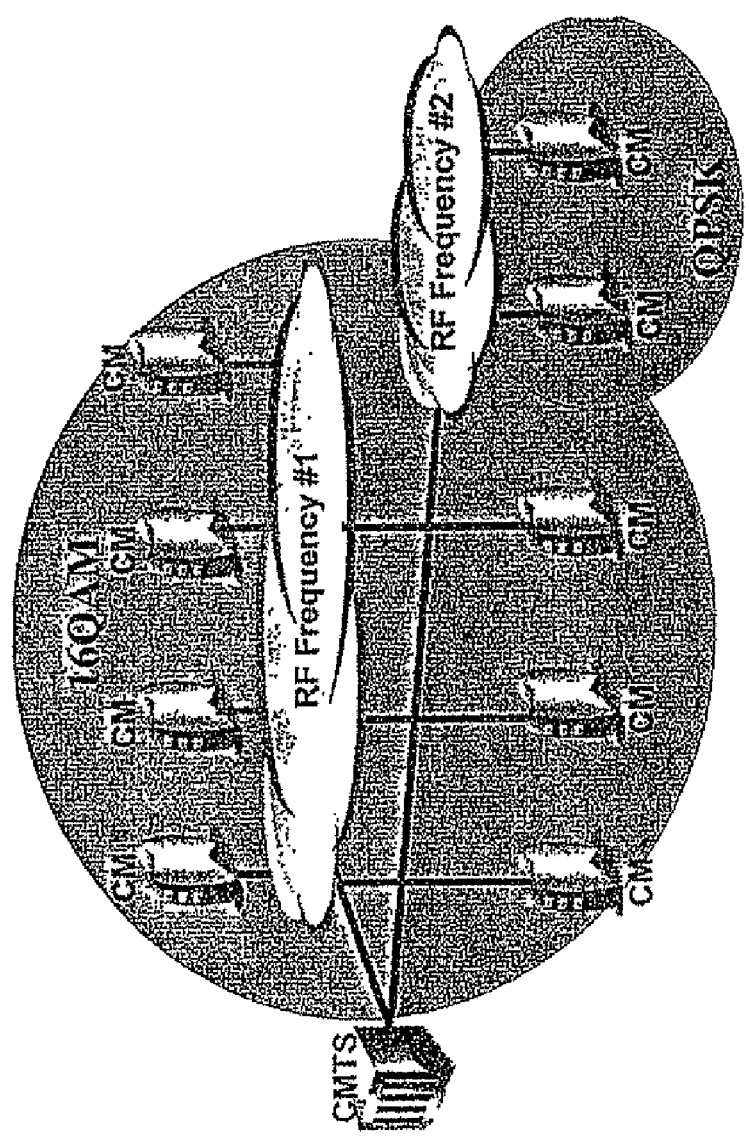
FIG. 13 illustrates an unequal number of CMs with different noise margins.
Figure 14:
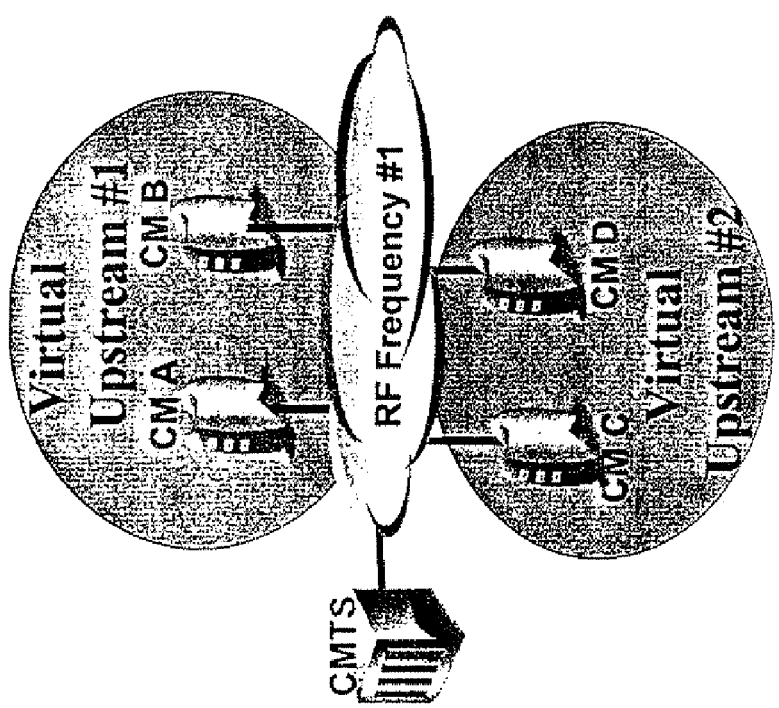
FIG. 14 is an example of virtual upstream channels using the same physical upstream frequency.

FIG. 14 is an example of virtual upstream channels using the same physical upstream frequency. Virtual upstream channel #1 supports two cable modems A and B while virtual upstream channel #2 supports two cable modems C and D. The CMTS (Cable Modem Termination System) and/or the head office will include one or more receivers each of which are typically tuned to a given physical upstream frequency. Hence, RF Frequency #1 would have one receiver "listening" or tuned to it, and in other embodiments of the invention discussed below, more than one receiver can be tuned simultaneously to the same physical upstream frequency.

Figure 15:
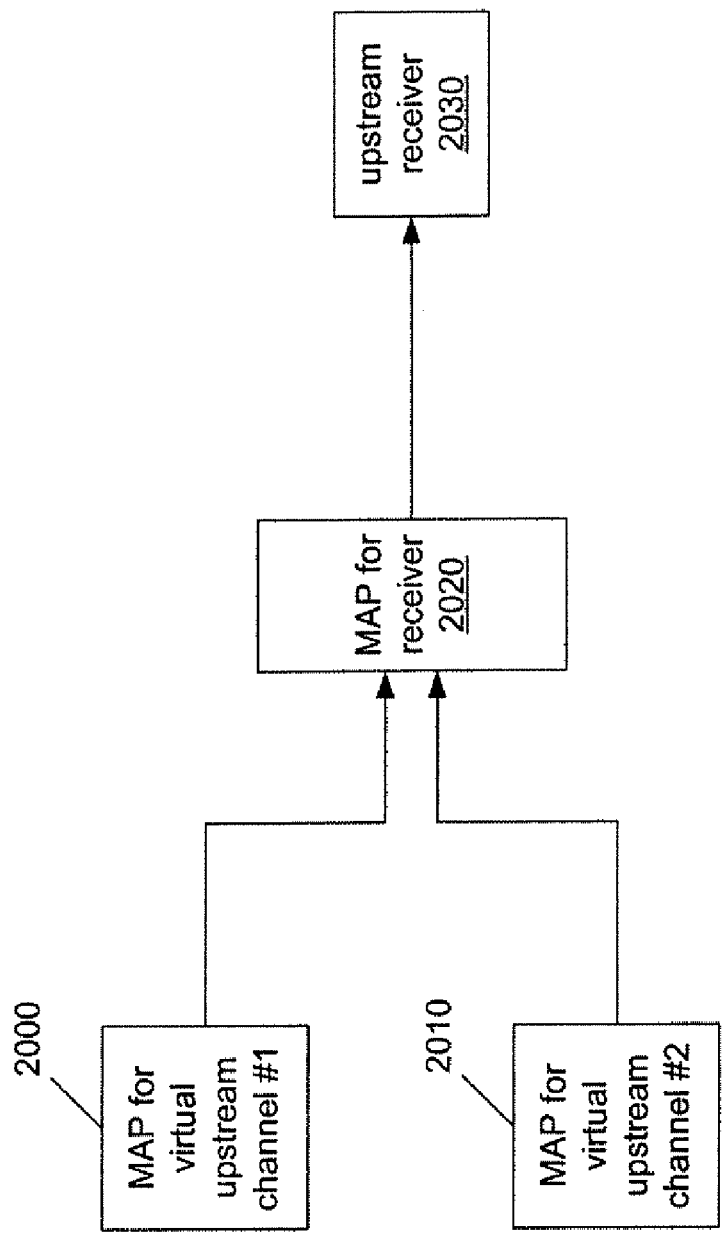
FIG. 15 illustrates one embodiment of the invention.

One key aspect in the design of upstream receiver(s) using virtual upstream channels is that the receivers receive a different MAP description than the one that is sent downstream with Upstream Channel IDs. FIG. 15 illustrates one embodiment of the invention. In this embodiment, the MAP for each virtual upstream channel (which is sent downstream by the CMTS) is combined into a single, different MAP message that is intended for the receiver. For two virtual upstream channels (as shown in FIG. 14) each would be sent its own MAP message by the CMTS. FIG. 15 shows a MAP 2000 for virtual upstream channel #1 and a MAP 2010 for virtual upstream channel #2 which would have been sent to the CMs in each virtual upstream channel. The IEs (Information Elements) in the MAPs 2000 and 2010 are combined to form a MAP 2020 intended for upstream receiver 2030. The MAP 2020 is more than just an appending of the IEs of one MAP with another, a detailed below.

For example, if two virtual upstream channels have been provisioned, the two bandwidth allocation MAP messages that are sent downstream are:

IEs of the Bandwidth Allocation MAP 2000 for Virtual Upstream Channel #1

| SID | IUC | Offset |
|-----|-----|--------|
| x3FFF | 1 | t1 |
| x0001 | 6 | t2 |
| x0002 | 6 | t3 |
| x3FFF | 3 | t4 |
| x0000 | 6 | t5 |
| x0000 | 0 | t9 |

IEs of the Bandwidth Allocation MAP 2010 for Virtual Upstream Channel #2

| SID | IUC | Offset |
|-----|-----|--------|
| x0000 | 6 | t1 |
| x3FFF | 1 | t5 |
| x0003 | 6 | t6 |
| x0004 | 6 | t7 |
| X3FFF | 3 | t8 |
| x0000 | 0 | t9 |

"Current" upstream receivers are those upstream receivers that cannot change its upstream channel characteristics from burst to burst. For purposes of segregating broadcast request opportunities and for the purposes of delay or clipping, for instance, virtual upstream channels will work with current upstream receivers provided the upstream channel characteristics are the same for all of the virtual upstream channels. In such case, the upstream receivers would receive all the messages without any need for special changes since changes are made on the provisioning of CMs (see Provisioning patent) and to the CMTS scheduler (which is instructed to send a MAP message per virtual upstream channel) (see Scheduling patent).

For example, if the example depicted in FIG. 14 uses the same Upstream Channel Descriptors, the CMTS should program the upstream receiver 2030 using the following IEs in MAP 2020:

Information Elements for MAP 2020 Sent to the Upstream Receiver 2030:

| SID | IUC | Offset |
|-----|-----|--------|
| x3FFF | 1 | t1 |
| x0001 | 6 | t2 |
| x0002 | 6 | t3 |
| x3FFF | 3 | t4 |
| x3FFF | 1 | t5 |
| x0003 | 6 | t6 |
| x0004 | 6 | t7 |
| x3FFF | 3 | t8 |
| x0000 | 0 | t9 |

Each of the MAPs 2000 and 2010 have IEs for offsets t1 and t5. In the pictured MAP 2020 for the upstream 1 receiver, the IE for offset t1 reflects the IE of virtual upstream channel #1 rather than the IE of virtual upstream channel #2. This IE has a SID of x3FFF and an IUC 1. Likewise, the IE for offset t5 reflects the IE of virtual upstream channel #2 rather than the IE of virtual upstream channel #1. This IE also has a SID of x3FFF and an IUC 1. This is due to the fact that while from the perspective of one virtual upstream channel a given offset may be assigned a null or place-holder SID, while actually, from the perspective of the other virtual upstream channel, the transmission area is actually at its beginning. The IE of the MAP 2020 thus reflects the actual usage of both virtual upstream channels and may not need any null SIDs or place-holder SIDs (except for that used to indicate the end of the total transmission area end of timeframe that the MAP message extends (offset t9). The resolution process of determining which information element to use in case of When there are virtual upstream channels with different upstream characteristics it is not possible (by definition) for current upstream receivers to change the things like symbol rate on the fly. In another embodiment of the invention, virtual upstream channels may make use different upstream channel descriptors. It is possible for current upstream receivers to implement virtual upstream channels if one allows more than one receiver to be tuned to the same frequency.

Figure 16:
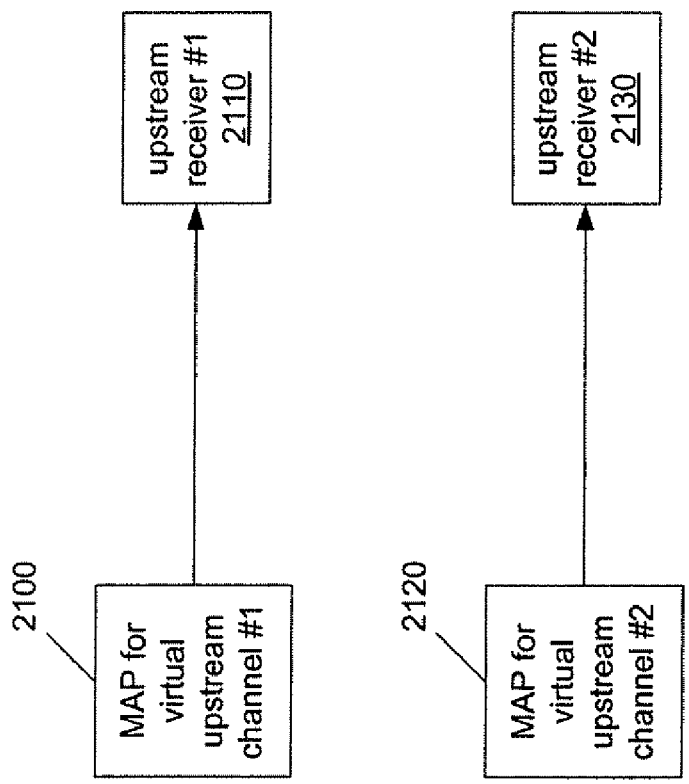
FIG. 16 illustrates one embodiment of the invention utilizing different upstream channel descriptors.

FIG. 16 illustrates one embodiment of the invention utilizing different upstream channel descriptors. In such a scheme, the CMTS uses as many different upstream channel descriptors as there are different upstream receivers. The CMTS scheduler sends, for each of the receivers, a proper MAP message that states the actual reception area but at the same time marks the time frames that the other virtual upstream channels are using to transmit as Initial Ranging areas. This is even though such corresponding areas marked as Initial Ranging are not actually Initial Ranging.

Each upstream receiver will receive a different MAP, and each MAP would correspond to one virtual upstream channel. If the example of FIG. 14 is used, where there are two virtual upstreams channels is considered, the result is as shown in FIG. 16. Thus, a first upstream receiver 2110 is sent a MAP 2100 for virtual upstream channel #1. Also, a second upstream receiver 2130 is sent a MAP 2120 for virtual upstream channel #2. The CMTS scheduler would construct the two different MAP messages 2100 an 2120 to the upstream receivers 2110 and 2130, respectively, that corresponds to the virtual upstream channels 1 and 2, respectively. In this case, one of the probable make-up of the two MAP messages that are being sent to the receivers are as follows:

Information Elements for the Upstream Receiver 1 (in MAP 2100):

| SID | IUC | Offset |
|-------|-----|--------|
| x3FFF | 1 | t1 |
| x0001 | 6 | t2 |
| x0002 | 6 | t3 |
| x3FFF | 3 | t4 |
| x3FFF | 3 | t5 |
| x3FFF | 0 | t9 |

Information Elements for the Virtual Upstream Channel 2 (in MAP 2120)

| SID | IUC | Offset |
|-------|-----|--------|
| x3FFF | 3 | t1 |
| x3FFF | 1 | t5 |
| x0003 | 6 | t6 |
| x0004 | 6 | t7 |

-continued

| SID | IUC | Offset |
|-------|-----|--------|
| x3FFF | 3 | t8 |
| x3FFF | 0 | t9 |

As observable from the above, an IUC of 3 (indicating Initial Ranging) is assigned to the IE for one upstream at a time offset which is a transmission area start for the other virtual upstream channel.

Figure 17:
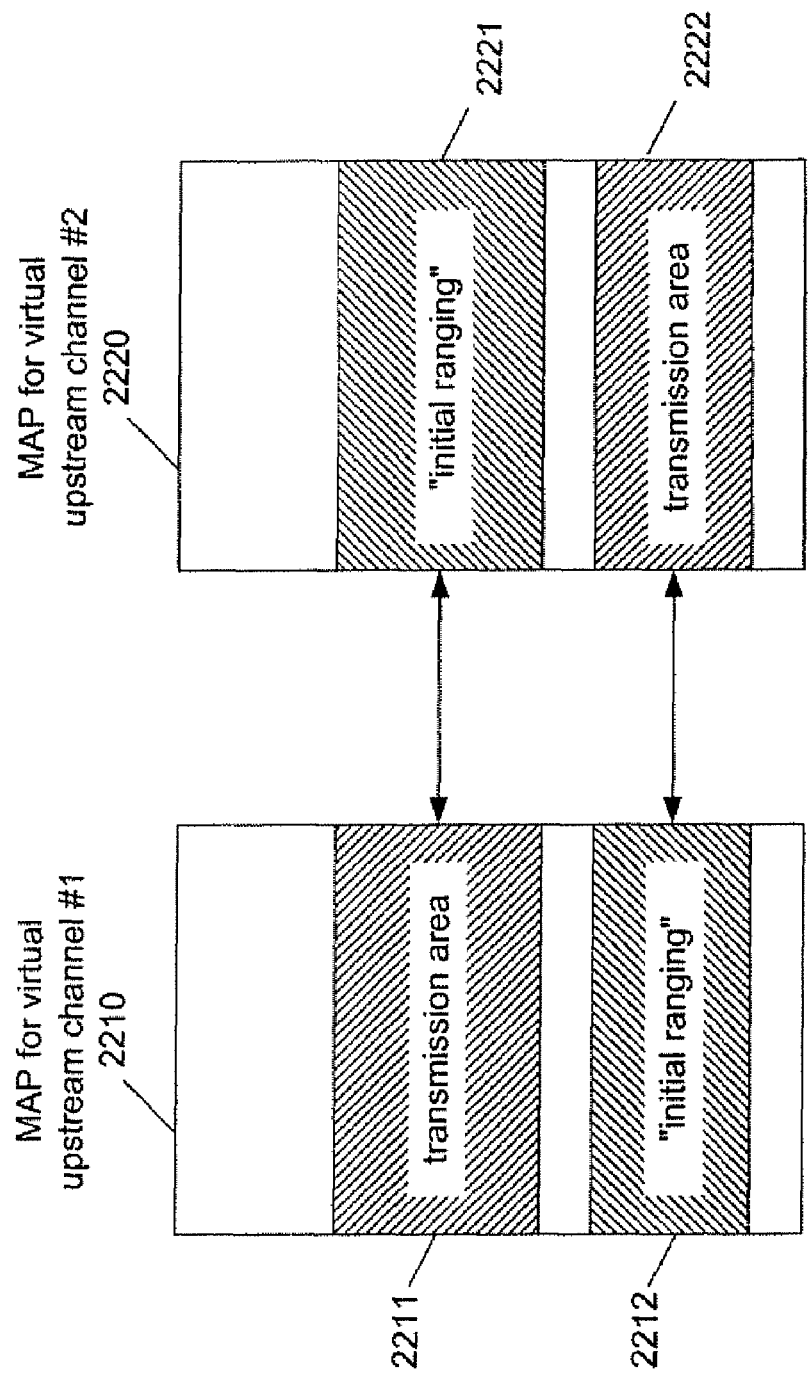
FIG. 17 illustrates implementation of different upstream channel descriptors.

This concept is illustrated in FIG. 17. A MAP 2210 for a virtual upstream channel #1 shows a shaded transmission area 2211. The MAP 2220 for virtual upstream channel #2 is constructed such that the transmission area 2211 in MAP 2210 is mapped to an initial ranging area 2222. Thus, while virtual upstream channel #1 is transmitting, the CMTS will see the CMs on virtual upstream channel #2 as being in a virtual Initial Ranging Area. Likewise, MAP 2220 for virtual upstream channel #2 shows a shaded transmission area 2211. The MAP 2220 for virtual upstream channel #2 is constructed such that the transmission area 2211 in MAP 2210 is mapped to an initial ranging area 2222. Thus, while virtual upstream channel #1 is transmitting, the CMTS will see the CMs on virtual upstream channel #2 as being in a virtual Initial Ranging Area. The example of FIG. 17 can be extended to those physical upstreams having more than two virtual upstream channels. In such cases, for each virtual upstream channel's transmission area, the CMTS scheduler will place an Initial Ranging IUC in the MAPs of other virtual upstream channels in the same timeslot. This technique is extended to include all of the virtual upstream channels that are available for given physical upstream frequency. It should be noted that it is possible to use other constructs but the receivers will be behave better in contention regions under the Initial Ranging technique.

Other Methods for Virtual Upstream Channel Receivers

The use of multiple upstream receivers is not necessary if the upstream receiver can change the upstream channel descriptors it is using per burst. This situation can be implemented using two different mechanisms: 1) using SID information, and 2) changing upstream profile context.

1) Using SID Information: There are three ways of using the SID and other MAP message information to implement changing upstream channel descriptors on a single upstream receiver. These are a) one to one mapping of SIDE: into upstream channel descriptors, b) embedding the upstream channel descriptor information in the SID, and (c) using the unused bit field in the SID.

a) One to One Mapping of SIDs into Upstream Channel Descriptors

There is a variation of this kind of upstream profiling. The most aggressive one uses a table that maps each SID into a burst profile setting. In this scheme, the receiver when it is to receive a burst looks into the SID value and then loads the proper burst profile settings. One requirement is that the broadcast areas have be identified differently for each upstream channel descriptor. The number of upstream channel descriptors that is to be supported is very important in the design of receivers that use SID information. In this case, the number of upstream channel descriptors would define the number of bits that has to be used in the table directly.

For example if two different burst profiles are to be used than the table would look like:

| SID | Burst Profile (0/1) |
|-----|---------------------|
| 1   | 0                   |
| 2   | 0                   |
| 3   | 1                   |
| 4   | 1                   |

In the example the SIDs 1 and 2 are with in the same virtual upstream channel whose burst profile is pointed by the value 0 just like 3 and 4 are in a different upstream channel whose burst profile is pointed by the value 1.

b) Embedding the Upstream Channel Descriptor Information in the SID

Instead trying to construct a big mapping table (the SID is a 14 bit field), it is possible to state that the upstream receiver would only support a limited number of upstream channel descriptors which are a power of 2. In this scheme the least significant 'n' bits would determine the burst type the SID belongs to. For example the SID x0101 would belong to upstream channel descriptor 1 and x0102 would belong to upstream channel descriptor 2. In this scheme it is still required to have a different type of SIDs that would be used for broadcast opportunities for each upstream channel descriptor type. This method has a weakness that the number of SIDs allocated to each group has to be same for each case. For some cases this might not be acceptable. Another stricture is that as the number of upstream channel descriptors increases, the number of SIDs that a upstream channel descriptor can use would decrease.

c) Using the Unused Bit Field in SID

Another method is to use the unspecified 2 bits of the 16-bit field in the SID. This way the broadcast bits do not have to be changed. This however only supports four different upstream channel descriptors. But this method is the least intrusive of all techniques discussed. Further, it needs no changes to the broadcast area definitions which would have to be changed for every upstream channel descriptor.

If the example given in FIG. 14 is to be implemented, use the different upstream channel descriptors which are to be referenced as 1 and 2, the CMTS should program the upstream receiver using the following IEs.

Information Elements for the Upstream Receiver:

| SID   | IUC | Offset |
|-------|-----|--------|
| x7FFF | 1   | t1     |
| x4001 | 6   | t2     |
| x4002 | 6   | t3     |
| x7FFF | 3   | t4     |
| xBFFF | 1   | t5     |
| x8003 | 6   | t6     |
| x8004 | 6   | t7     |
| xBFFF | 3   | t8     |
| x0000 | 0   | t9     |

2) Using upstream profile context: The upstream profile context uses the receiver MAP message to encode the upstream channel descriptor context. The method is robust and does not have to change even if the scheduling system decided to use the Interval Usage Code (IUC). This is due to the fact that only the context of an IUC is being used between the CMTS scheduler and the upstream receiver and not the IUC itself. The context is sent in the downstream direction to be consumed by the CMs.

Another way to use the upstream profile, is by using a upstream channel descriptor pointer. In this method instead of embedding the information in the SID bit field, a new receiver MAP Interval Usage Code of "13" (IUC=13) is introduced for changing the upstream channel descriptor. It is possible to specify that the SID has to be zero. The bit-field between bits 18 and 31 will identify which upstream channel descriptor is to be used as a pointer to upstream channel descriptor table. Using this method as in using unused bit-field in SID' there is no need to define different broadcast area codes since the SID is not used in mapping.

The number of upstream channel descriptors can be as large as needed, and it is possible that different receivers use the same upstream channel descriptor table. For example, if the example given in FIG. 14 is to use the different upstream channel descriptors, which are to be referenced as 1 and 2, the CMTS should program the upstream receiver using the following IEs:

Information Elements for the Upstream Receiver:

| SID   | IUC | Offset |
|-------|-----|--------|
| x0000 | 13  | 1      |
| x3FFF | 1   | t1     |
| x0001 | 6   | t2     |
| x0002 | 6   | t3     |
| x3FFF | 3   | t4     |
| x0000 | 13  | 2      |
| x3FFF | 1   | t5     |
| x0003 | 6   | t6     |
| x0004 | 6   | t7     |
| x3FFF | 3   | t8     |
| x0000 | 0   | t9     |

Although the present invention has been described in detail with reference to the disclosed embodiments thereof, those skilled in the art will appreciate that various substitutions and modifications can be made to the examples described herein while remaining within the spirit and scope of the invention as defined in the appended claims. Also, the methodologies described may be implemented using any combination of software, specialized hardware, firmware or a combination thereof and built using ASICs, dedicated processors or other such electronic devices.

What is claimed is:

1. A network device comprising:
   a receiver unit to:
      receive, via an upstream radio frequency, messages associated with a plurality of virtual upstream channels, each of the messages including a first set of information elements, and
      output the messages; and
   a processor to:
      receive the messages from the receiver unit,
      combine a first one of the messages that is associated with a first one of the virtual upstream channels and a second one of the messages that is associated with a second one of the virtual upstream channels to form a receiver message that reflects usage of the first and second virtual upstream channels, and
      forward the receiver message to the receiver unit.

2. The network device of claim 1, wherein the receiver message includes a second set of information elements that includes the first sets of the information elements of the first and second messages.

3. The network device of claim 1, wherein the receiver message includes a second set of information elements that differs from the first set of the information elements of the first message and the first set of the information elements of the second message.

4. The network device of claim 1, wherein the first set of information elements includes at least one of a service identifier, an interval usage code, or a time offset.

5. The network device of claim 1, wherein the first set of information elements of each of the messages includes a same upstream channel descriptor.

6. The network device of claim 1, the information elements being indexed by time offsets, wherein the processor is further configured to resolve conflicts between those of the first set of the information elements of the first message and the first set of the information elements of the second message that are indexed by a same time offset.

7. The network device of claim 6, wherein the processor is configured to resolve the conflicts by designating, as an information element for the receiver message, ones of those of the first set of the information elements of the first message and the first set of the information elements of the second message that are indexed by the same time offset, which do not have a placeholder service identifier.

8. The network device of claim 1, wherein the network device comprises a cable modem termination system.

9. In a broadband communication system, a method comprising:

receiving, via an upstream frequency, a first message associated with a first user device and corresponding to a first virtual upstream channel and a second message associated with a second user device and corresponding to a second virtual upstream channel, each of the first and second messages including descriptions; and forming a downstream message including a description that includes upstream channel identifiers (UCIDs) associated with the first and second user devices, wherein the descriptions of the first and second messages differs from the description of the downstream message.

10. The method of claim 9, further comprising:

generating, prior to the forming the downstream message, a first downstream message including a description that includes a UCID associated with the first user device and a second downstream message including a description that includes UCID associated with the second user device, wherein the forming the downstream message includes combining the first and second downstream messages.

11. The method of claim 10, further comprising:

forwarding the downstream message downstream in lieu of the first and second downstream messages.

12. The method of claim 9, wherein the forming the downstream message comprises combining at least a portion of the first message and the second message.

13. The method of claim 9, the descriptions of the first and second messages including a set of information elements, wherein the forming the downstream message is based on the sets of information elements.

14. The method of claim 13, the information elements being indexed by time offsets, wherein the forming the downstream message comprises resolving an instance when two or more of the information elements are indexed by a same time offset.

15. The method of claim 14, wherein the resolving comprises selecting, as an information element to be included in the downstream message, one of the two or more information elements, which one does not have a placeholder service identifier.

16. The method of claim 13, the information elements including at least one of a service identifier, an interval usage code, or a time offset, wherein the forming the downstream message comprises combining the at least one the service identifier, the interval usage code, or the time offset from each of the first and second messages.

17. The method of claim 9, wherein the receiving the first and second messages comprises receiving messages having a same upstream channel descriptor.

18. The method of claim 9, wherein the forming the downstream message comprises forming the downstream message to indicate a usage of the first and second virtual upstream channels.

19. The method of claim 9, further comprising:

generating, prior to the forming the downstream message, a first receiver message corresponding to the first message and a second receiver message corresponding to the second message, wherein the forming the downstream message is based on the first and second receiver messages.

20. A cable modem termination system comprising:

means for receiving, via an upstream frequency, a first message associated with a first user device and corresponding to a first upstream channel and a second message associated with a second user device and corresponding to a second upstream channel, each of the first and second messages including descriptions; and means for forming a downstream message including a description that includes upstream channel identifiers associated with the first and second users devices, where the description of the downstream message indicates usage of the first and second upstream channels; and means for forwarding the downstream message to network devices associated with the first and second user devices.

* * * * *